United States Patent
Lindskog et al.

(10) Patent No.: US 9,396,569 B2
(45) Date of Patent: *Jul. 19, 2016

(54) DIGITAL IMAGE MANIPULATION

(71) Applicant: Mobile Imaging in Sweden AB, Lund (SE)

(72) Inventors: Alexander Lindskog, Lund (SE); Gustaf Pettersson, Lund (SE); Ulf Holmstedt, Lund (SE); Johan Windmark, Lund (SE); Sami Niemi, Skanor (SE)

(73) Assignee: Mobile Imaging in Sweden AB, Lund (SE)

( * ) Notice: Subject to any disclaimer, the term of this patent is extended or adjusted under 35 U.S.C. 154(b) by 254 days.

This patent is subject to a terminal disclaimer.

(21) Appl. No.: 14/037,708

(22) Filed: Sep. 26, 2013

(65) Prior Publication Data

US 2014/0101590 A1 Apr. 10, 2014

Related U.S. Application Data

(63) Continuation of application No. 13/026,500, filed on Feb. 14, 2011, now Pat. No. 8,594,460.

(30) Foreign Application Priority Data

Feb. 15, 2010 (SE) .................................. 1000142

(51) Int. Cl.
*G06T 11/60* (2006.01)
*G06T 11/00* (2006.01)
(Continued)

(52) U.S. Cl.
CPC ............ *G06T 11/60* (2013.01); *G06F 3/04845* (2013.01); *G06T 5/005* (2013.01); *G06T 5/50* (2013.01); *G06T 11/00* (2013.01)

(58) Field of Classification Search
CPC ........... G06T 11/00; G06F 3/00; H04N 21/00
USPC .......... 382/100, 218, 254, 290; 345/619, 652, 345/654, 689; 348/222.1, 352
See application file for complete search history.

(56) References Cited

U.S. PATENT DOCUMENTS 6,075,905 A * 6/2000 Herman .................. G06K 9/32 348/588
6,105,045 A 8/2000 Kurabayashi et al.
(Continued)

FOREIGN PATENT DOCUMENTS

EP 1 613 060 A1 1/2006
EP 1942401 A1 7/2008
(Continued)

OTHER PUBLICATIONS

Farin, et al., *Shortest Circular Paths on Planar Graphs*, 27th Symposium on Information Theory in the Benelux (2006) pp. 117-124.
(Continued)

*Primary Examiner* — Abolfazl Tabatabai
(74) *Attorney, Agent, or Firm* — Alston & Bird LLP

(57) ABSTRACT

There is disclosed a method for seamlessly replacing areas in a digital image with corresponding data from temporally close digital images depicting substantially the same scene. The method uses localized image registration error minimization over a fixed preliminary boundary. A least cost closed path which constitutes a boundary for the area to be replaced is calculated using dynamic programming. The replacement area is blended such that image data information from one image is seamlessly replaced with image data information from another image.

21 Claims, 8 Drawing Sheets

(51) Int. Cl.
*G06F 3/0484* (2013.01)
*G06T 5/00* (2006.01)
*G06T 5/50* (2006.01)
*G09G 5/00* (2006.01)

(56) References Cited

U.S. PATENT DOCUMENTS

| | | | |
|---|---|---|---|
| 6,529,627 B1 | 3/2003 | Callari et al. | |
| 6,542,645 B1 | 4/2003 | Silverbrook et al. | |
| 6,621,524 B1 | 9/2003 | Iijima et al. | |
| 6,724,386 B2 | 4/2004 | Clavadetscher | |
| 6,750,903 B1* | 6/2004 | Miyatake | H04N 5/23238 348/218.1 |
| 6,927,874 B1 | 8/2005 | Enokida et al. | |
| 6,975,352 B2 | 12/2005 | Seeger et al. | |
| 6,985,172 B1* | 1/2006 | Rigney | G06K 9/00335 348/149 |
| 7,099,510 B2* | 8/2006 | Jones | G06K 9/6256 348/142 |
| 7,133,069 B2 | 11/2006 | Wallach et al. | |
| 7,339,580 B2 | 3/2008 | Westerman et al. | |
| 7,659,923 B1 | 2/2010 | Johnson | |
| 7,787,664 B2* | 8/2010 | Luo | G06K 9/00248 382/118 |
| 8,127,232 B2 | 2/2012 | Pavley et al. | |
| 8,160,152 B2 | 4/2012 | Murayama et al. | |
| 8,463,020 B1 | 6/2013 | Schuckmann et al. | |
| 8,494,306 B2 | 7/2013 | Sorek et al. | |
| 8,497,920 B2 | 7/2013 | Levoy et al. | |
| 8,594,460 B2* | 11/2013 | Lindskog | G06T 11/00 345/619 |
| 2001/0020978 A1 | 9/2001 | Matsui et al. | |
| 2002/0159632 A1 | 10/2002 | Chui et al. | |
| 2003/0071908 A1 | 4/2003 | Sannoh et al. | |
| 2003/0147000 A1 | 8/2003 | Shiraishi | |
| 2003/0189647 A1 | 10/2003 | Kang | |
| 2003/0190090 A1 | 10/2003 | Beeman et al. | |
| 2004/0080661 A1 | 4/2004 | Afsenius et al. | |
| 2004/0165788 A1 | 8/2004 | Perez et al. | |
| 2004/0201699 A1 | 10/2004 | Parulski et al. | |
| 2004/0223649 A1 | 11/2004 | Zacks et al. | |
| 2005/0007483 A1 | 1/2005 | Zimmermann et al. | |
| 2005/0031214 A1 | 2/2005 | Zhang et al. | |
| 2005/0099514 A1 | 5/2005 | Cozier et al. | |
| 2005/0122412 A1 | 6/2005 | Shirakawa et al. | |
| 2006/0001650 A1 | 1/2006 | Robbins et al. | |
| 2006/0022961 A1 | 2/2006 | Kaminaga | |
| 2006/0028579 A1 | 2/2006 | Sato | |
| 2006/0038908 A1 | 2/2006 | Yoshino | |
| 2006/0044444 A1 | 3/2006 | Okamoto et al. | |
| 2006/0061845 A1 | 3/2006 | Lin | |
| 2006/0171687 A1 | 8/2006 | Aiso | |
| 2006/0181614 A1 | 8/2006 | Yen et al. | |
| 2006/0187321 A1 | 8/2006 | Sakamoto | |
| 2007/0024721 A1 | 2/2007 | Rogers | |
| 2007/0058064 A1 | 3/2007 | Hara et al. | |
| 2007/0097206 A1 | 5/2007 | Houvener et al. | |
| 2007/0237421 A1 | 10/2007 | Luo et al. | |
| 2007/0274563 A1 | 11/2007 | Jung et al. | |
| 2008/0062141 A1 | 3/2008 | Chandhri | |
| 2008/0143744 A1 | 6/2008 | Agarwala | |
| 2008/0152258 A1 | 6/2008 | Tulkki | |
| 2008/0165141 A1 | 7/2008 | Christie | |
| 2008/0218611 A1 | 9/2008 | Parulski et al. | |
| 2008/0218613 A1 | 9/2008 | Janson et al. | |
| 2009/0019399 A1 | 1/2009 | Matsunaga et al. | |
| 2009/0046943 A1 | 2/2009 | Ishiga | |
| 2009/0073285 A1 | 3/2009 | Terashima | |
| 2009/0141046 A1 | 6/2009 | Rathnam et al. | |
| 2009/0190803 A1 | 7/2009 | Neghina et al. | |
| 2009/0204920 A1 | 8/2009 | Beverley et al. | |
| 2009/0244301 A1 | 10/2009 | Border et al. | |
| 2009/0245685 A1 | 10/2009 | Makii | |
| 2009/0251591 A1 | 10/2009 | Whitham | |
| 2009/0295830 A1 | 12/2009 | Muraveynyk et al. | |
| 2009/0303338 A1 | 12/2009 | Chaurasia et al. | |
| 2009/0309990 A1 | 12/2009 | Levoy et al. | |
| 2009/0322926 A1 | 12/2009 | Ikeda et al. | |
| 2010/0025123 A1 | 2/2010 | Lee et al. | |
| 2010/0045608 A1 | 2/2010 | Lessing | |
| 2010/0079498 A1 | 4/2010 | Zaman et al. | |
| 2010/0149367 A1 | 6/2010 | Yim et al. | |
| 2010/0268729 A1 | 10/2010 | Nara et al. | |
| 2011/0200259 A1 | 8/2011 | Lindskog et al. | |
| 2012/0262490 A1 | 10/2012 | Niemi | |
| 2014/0177975 A1 | 6/2014 | Lindskob et al. | |
| 2014/0184852 A1 | 7/2014 | Niemi | |

FOREIGN PATENT DOCUMENTS

| | | |
|---|---|---|
| EP | 2 124 186 A1 | 11/2009 |
| EP | 2 175 635 A1 | 4/2010 |
| EP | 2 323 102 A1 | 5/2011 |
| JP | 2010 020581 A | 1/2010 |
| WO | WO 01/59709 A1 | 8/2001 |
| WO | WO 2004/068865 A1 | 8/2004 |
| WO | WO-2005/050567 A1 | 6/2005 |
| WO | WO 2007/006075 A1 | 1/2007 |
| WO | WO 2007/038198 A1 | 4/2007 |
| WO | WO 2008/038883 A1 | 4/2008 |
| WO | WO 2008/064349 A1 | 5/2008 |
| WO | WO-2009/156561 A1 | 12/2009 |
| WO | WO 2011/040864 A1 | 4/2011 |

OTHER PUBLICATIONS

Itti, et al., *A Model of Saliency-based Visual Attention for Rapid Scene Analysis*, IEEE Transactions on Pattern Analysis and Machine Intelligence, vol. 20, No. 11 (1998) pp. 1254-1259.
Aseem Agarwala, et al., *Interactive Digital Photomontage*, ACM Transactions on Graphics, Aug. 1, 2004, vol. 23, No. 3, pp. 294-302; ISSN: 0730-0301; XP-002359799; figure 1; abstract.
A.A.Isola, et al., *Motion compensated iterative reconstruction of a region of Interest in cardiac cone-beam CT*, Computerized Medical Imaging and Graphics, Mar. 1, 2010, vol. 34, No. 2, pp. 149-159, ISSN:0895-6111, abstract.
International Search Report: mailed Jul. 20, 2010; Search Request No. ITS/SE10/00034.
Swedish Office Action dated Jul. 20, 2010; Ref: SE-21046020.
Office Action for U.S. Appl. No. 13/026,500 dated Jul. 31, 2012.
Office Action for U.S. Appl. No. 13/026,500 dated Jan. 2, 2013.
Notice of Allowance for U.S. Appl. No. 13/026,500 dated May 21, 2013.
Notice of Allowance for U.S. Appl. No. 13/026,500 dated Jul. 24, 2013.
Notice of Allowance for U.S. Appl. No. 14/037,563 dated Aug. 14, 2014.
Notice of Allowance for U.S. Appl. No. 14/037,563 dated Dec. 12, 2014.
Ling, H. et al., *Diffusion Distance for Histogram Comparison*, IEEE Computer Society Conference on Computer Vision and Pattern Recognition, (2006) 8 pages.
Jiebo Luo et al. *Highly Automated Image Recomposition: The Picture You Wish You Had Taken*, 2006 Western New York Image Processing Workshop, Sep. 29, 2006, Rochester Institute of Technology, Chester F. Carlson Center for Imaging Science Auditorium, Building 76, Rochester, NY 14623. Download from Internet http://citeseerx.ist.psu.edu/viewdoc/download?doi=10.1.1.102.8032&rep=repl&type=pdf#page=27.
Matthews, K. E. et al., *Simultaneous Motion Parameter Estimation and Image Segmentation using the EM Algorithm*, Oct. 23-26, 1995, download from internet: http://ieeexplore.ieee.org/xpl/login.jsp?reload=true&tp=&arnumber=531423&url=http%3A%2F%2Fieeexplore.ieee.org%2Fxpls%2Fabs_all.jsp%3Farnumber%3D531423.
Ojala, T. et al., *Multiresolution Gray-Scale and Rotation Invariant Texture Classification With Local Binary Patterns*, IEEE Transactions on Pattern Analysis and Machine Intelligence, vol. 24, No. 7 (Jul. 2002) 971-987.

(56) References Cited

OTHER PUBLICATIONS

Oliva, A. et al., *Modeling the Shape of the Scene: A Holistic Representation of the Spatial Envelope*, International Journal of Computer Vision 42(3), (2001) 145-175.
Shutao Li et al., *Multifocus Image Fusion Using Region Segmentation and Spatial Frequency*, ScienceDirect, Image and Vision Computing, vol. 26 (2008) pp. 971-979.
Wandell, B. et al., *Multiple Capture Single Image Architecture With a CMOS Sensor*, Proceedings of the International Symposium on Multispectral Imaging and Color Reproduction for Digital Archives (Society of Multispectral Imaging of Japan), (Oct. 21-22, 1999) 11-17.
Canon: "Powershot S95 Camera User Guide" [online] [retrieved Jun. 1, 2015]. Retrieved from the Internet: UR: http://gd1p01.c-wss.com/gds/4/0300003994/02/PSS95_CUG_EN_02.pdf>. (dated 2010) 196 pages.
International Search Report/Written Opinion for Application No. PCT/SE2010/051019 dated Jan. 21, 2011.
International Search Report/Written Opinion for Application No. PCT/SE2012/050584 dated Sep. 6, 2012.
Office Action for European Application No. 12 793 286.1 dated Oct. 2, 2014.
Supplementary European Search Report for Application No. EP 12 79 3286 dated Feb. 4, 2015.
Office Action for European Application No. 11 15 3998 dated Mar. 9, 2015.
Office Action for U.S. Appl. No. 13/499,711 dated Feb. 27, 2015.
Notice of Allowance for U.S. Appl. No. 14/037,563 dated Mar. 31, 2015.
Office Action for U.S. Appl. No. 14/118,493 dated Feb. 6, 2015.
Extended European Search Report for corresponding European Application No. 12814902.8 dated Jun. 1, 2015, 9 pages.
International Type Search Report and Written Opinion for Application No. ITS/SE10/00290 dated May 2, 2011.
International Search Report and Written Opinion for Application No. PCT/SE2012/050688 dated Oct. 26, 2012.
Office Action for Canadian Application No. 2,841,910 dated Apr. 17, 2015.
Peleg, S. et al., *Stereo Panorama With a Single Camera*, Proceedings of the 1999 IEEE Computer society conference on Computer Vision and Pattern Recognition, IEEE, vol. 1 (Jun. 1999) pp. 395-401.
Shum, H-Y. et al., *Rendering with Concentric Mosaics*, SIGGRAPH 99, ACM (1999) 299-306.
Notice of Allowance for U.S. Appl. No. 14/037,563 dated Jul. 20, 2015.
Office Action for U.S. Appl. No. 14/118,493 dated Aug. 4, 2015.
Extended European Search Report for corresponding European Application No. 11153998.7 Aug. 12, 2015, 9 pages.
Xiong, Y. et al., *Fast Panorama Stitching n Mobile Devices*, Consumer Electronics (ICCE), 2010 Digest of Technical Papers International Conference, (Jan. 2010) 319-320.
Notice of Allowance for U.S. Appl. No. 14/118,493 dated Dec. 30, 2015.
Supplementary European Search Report for Application No. EP 10 82 0903 dated Dec. 18, 2015.
Office Action for U.S. Appl. No. 13/449,711 dated Oct. 5, 2015.
Office Action for U.S. Appl. No. 14/233,053 dated Sep. 11, 2015.
Atallah, M. J. et al., *An Optimal Algorithm for Shortest Paths on Weighted Interval and Circular-Arc Graphs, With Applications*, Algorithms ESA '93 19930930 Springer, Berlin, Heidelberg, vol. 726, pp. 13-24.
Third-Party Submission for U.S. Appl. No. 14/037,708 dated Jun. 12, 2015.
Office Action for U.S. Appl. No. 13/499,711 dated Mar. 31, 2016.
Notice of Allowance for U.S. Appl. No. 14/118,493 dated Jan. 21, 2016.
Office Action for European Application No. 12 793 286.1 dated Feb. 15, 2016.

* cited by examiner

Fig. 4A
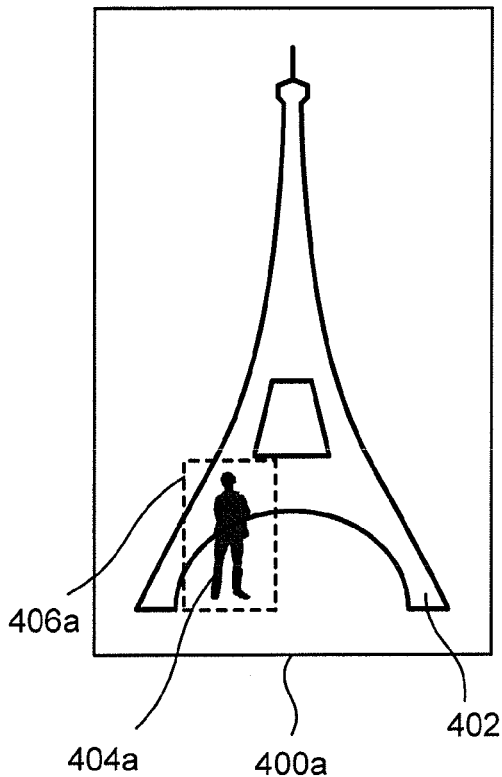
Fig. 4B
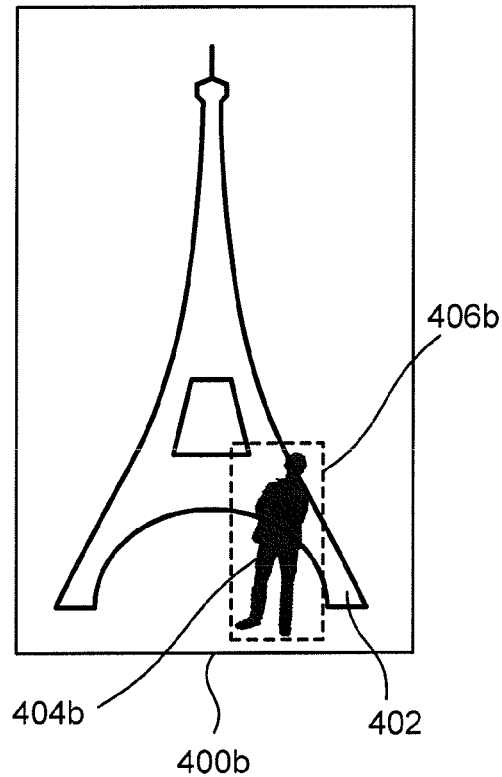
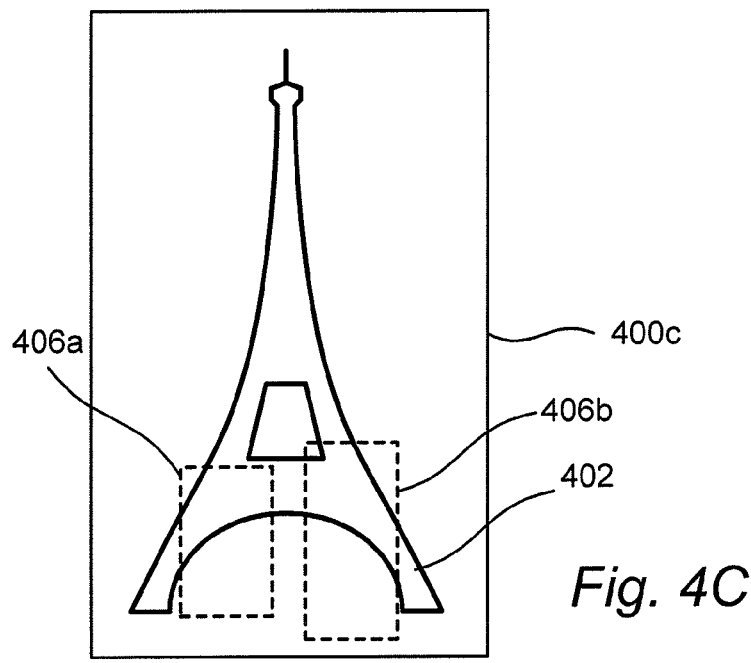
Fig. 4C

DIGITAL IMAGE MANIPULATION

CROSS REFERENCE TO RELATED APPLICATION

This application is a continuation of and claims priority to U.S. application Ser. No. 13/026,500, filed Feb. 14, 2011, which claims priority to Swedish Application No. 1000142-8, filed Feb. 15, 2010, the entire contents of which are hereby incorporated by reference.

TECHNICAL FIELD OF THE INVENTION

The present invention relates to the field of digital image processing, and more particularly to methods for digital image manipulation. There is also provided apparatuses and a computer program product thereof.

BACKGROUND OF THE INVENTION

Over the last few years mobile communications apparatuses, such as mobile phones, have evolved from being just communications devices to being handheld multimedia devices. In comparison to earlier mobile communications apparatuses more recent mobile communications apparatuses have larger screens, more memory, more computational power. Some mobile communications apparatuses even comprises image capturing devices arranged to capture both still images and video sequences having a resolution of several megapixel per image.

In combination with higher memory capacity and computational power this enables image processing to take place on the mobile communications apparatus itself instead of on a dedicated computer running dedicated image processing tools. Furthermore, although powerful, dedicated image processing tools may be complex and as such have a high learning curve for the user. It may therefore be desirable for the user to be able to perform advanced image processing directly on the mobile communications apparatuses, i.e. without having to resort to using a dedicated computer or to spend time learning how to use complex tools.

SUMMARY OF THE INVENTION

Although methods, apparatuses and computer program products according to the state of the art are capable of performing image processing there is still a need for improved image processing tools such as simple yet powerful programs that are easy to use and produces pictures with high photorealism.

According to a first aspect there is provided a method for digital image manipulation comprising: receiving a source image and a target image; identifying a source area in the source image, the source area having a set of coordinates; using the set of coordinates for the source area to, in response to the identifying the source area, identify a target area in the target image; and forming a digital image based on image data information of the target image, wherein image data information of the target area is seamlessly replaced with image data information of the source area.

According to a second aspect there is provided a method for digital image manipulation comprising: receiving a source image and a target image; identifying a source area in the source image, the source area having a set of coordinates; using the set of coordinates for the source area to, in response to the identifying the source area, identify a target area in the target image; and forming a digital image based on image data information of the source image, wherein image data information of the source area is seamlessly replaced with image data information of the target area.

Thus a digital image may be formed based on image data information of one of the target image, wherein image data information of the target area is seamlessly replaced with image data information of the source area, or the source image, wherein image data information of the source area is seamlessly replaced with image data information of the target area.

The methods thus allow areas of digital images to be seamlessly replaced. The methods enable areas of imperfections to be seamlessly replaced with areas from other images. For example, an area of an image depicting human beings with closed eyes may be replaced with a corresponding area from another (similar) image wherein the eyes of the (same) human being is open, inter alia by allowing a user to replace parts of an image with the same area from other images.

The target area in the target image may be identified by determining an error function between the source area and the target area. The error function may be determined over a set of sample points in an area S along a preliminary cut dΩ between the source area and the target area for zero translation. The preliminary cut may then be translated outwards from the zero translation until the error function is minimized. The error function may thereby be used to determine the target area in the target image. The translation outwards may be performed along a spiral formed trajectory.

Preferably the images are similar in such a way that they depict the same scene (comprising the same photographic elements) and are taken in succession with a fairly small temporal distance in between the captures.

The method may further comprise receiving feature information relating to a feature of at least one of the source image and the target image, wherein at least one of the source area and the target area comprises the feature; and identifying the source area based on the feature.

The method may further comprise determining whether or not one of the source area and the target area fulfills a condition relating to the feature information; and forming the digital image based on the determining. Thereby the formed image may be determined to comprise an area or object comprising a predetermined feature.

The set of coordinates for the source area are used such that a set of coordinates for the target area in the target image corresponds to the set of coordinates for the source area. Thereby the target area may be easily determined.

Identifying the target area may further comprise finding a compensation movement between at least a part of the source image and at least a part of the target image, such that the compensation movement minimizes a difference between the source image and the target image. Thereby the source image and the target image do not need to be perfectly (i.e. pixel-by-pixel) aligned.

The method may further comprise using a thin plate spine method to find the compensation movement. Thereby a fast and efficient movement compensation may be achieved The detail measure may be based on data unit lengths of data units in the candidate source area and the candidate target area. Thereby a fast but yet accurate detail measure may be used.

The method may further comprise blending the source image and the target image using quad-tree optimization. Thereby a fast and efficient blending may be achieved.

The method may further comprise replacing one of the target image and the source image with the formed digital image. Thereby memory requirements may be reduced.

The source image and the target image may have been encoded. The method may further comprise in the source image decoding only image data information representing the source area; and in the target image decoding only image data information representing the target area. Thereby fast image manipulation may be achieved.

The source area may correspond to a source object. The target area may correspond to a target object. The source object and the target object may represent one and the same object. Thereby object recognition may be used to improve the method.

The method may further comprise receiving a signal identifying the source area. The signal may be associated with user input. Thereby the source area may be identified by a user.

According to a third aspect the present invention is realized by an apparatus for digital image manipulation comprising: means for receiving a source image and a target image; means for identifying a source area in the source image, the source area having a set of coordinates; means for using the set of coordinates for the source area to, in response to the identifying the source area, identify a target area in the target image; and means for forming a digital image based on image data information of the target image, wherein image data information of the target area is seamlessly replaced with image data information of the source area.

According to a fourth aspect the present invention is realized by an apparatus for digital image manipulation comprising: means for receiving a source image and a target image; means for identifying a source area in the source image, the source area having a set of coordinates; means for using the set of coordinates for the source area to, in response to the identifying the source area, identify a target area in the target image; and means for forming a digital image based on image data information of the source image, wherein image data information of the source area is seamlessly replaced with image data information of the target area.

The apparatus of the third and/or fourth aspect may further comprise a camera and the source image and/or the target image may be received from the camera.

According to a fifth aspect, the present invention is realized by a computer program product for digital image manipulation. There is thus disclosed a computer program product comprising software instructions that when downloaded to a computer is configured to perform image processing according to the above methods for digital image manipulation. The computer program product may be provided in a computer-readable storage medium.

The second, third, fourth and fifth aspects may generally have the same features and advantages as the first aspect. Other objectives, features and advantages of the present invention will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail by way of non-limiting examples, reference being made to the enclosed drawings, in which:

FIGS. 2A, 2B, 2C, 3A, 3B, 3C, 3D, 4A, 4B, 4C, 5A, 5B, and 5C are schematic illustrations according to example embodiments;

DETAILED DESCRIPTION OF PREFERRED EMBODIMENTS

The present invention will now be described more fully hereinafter with reference to the accompanying drawings, in which certain embodiments are shown. Like numbers refer to like elements throughout. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. For example, for illustrative purposes the subject-matter is disclosed in a JPEG context. However, the subject-matter is also applicable to other standards and formats, mutatis mutandis.

Figure 1A:
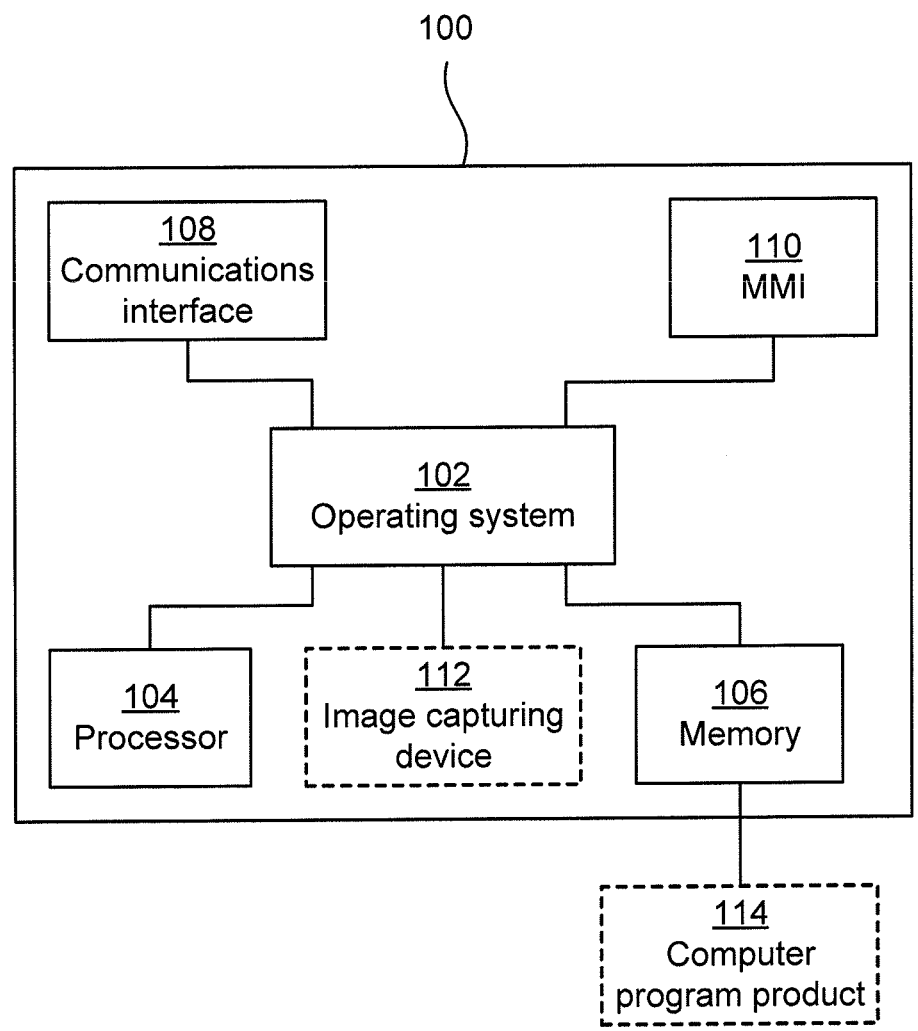
FIGS. 1A and 1B are schematic illustration of apparatuses according to embodiments.

FIG. 1A is a schematic illustration of a mobile communications apparatus 100 according to an embodiment. The apparatus 100 may be a computer. The apparatus 100 may be a personal digital assistant (PDA). The apparatus 100 may be a mobile phone. The apparatus 100 generally comprises circuitry arranged to perform a number of operations and will be described in terms of functional blocks. In general, the functional blocks may be implemented in various ways, such as one or more field programmable gate arrays (FPGAs), applications specified integrated circuits (ASICs), or the like. The apparatus 100 comprises a processor functional block 104, which may be embodied as a central processing unit and/or a dedicated image processing unit, such as a JPEG hardware accelerator. The processor may also refer to a graphics processing unit (GPU), capable of calculations, such as pixel/fragment shaders in OpenGL/OpenCL. The image processing unit may be implemented as a computer program product comprising one or more software components, or as a dedicated hardware unit for image processing. The software components may comprise software instructions that when downloaded to a computer are configured to perform the instructions associated with the image processing unit. The apparatus 100 further comprises a memory functional block 106, which may be embodied as a memory or a computer-readable storage medium, such as a random access memory (RAM), a read-only memory (ROM), a universal series bus (USB) product, such as a memory stick, or the like. The apparatus 100 further comprises a communications functional block 108, which may be embodied as a receiver and a transmitter and/or a transceiver, inter alia configured to receive input from, and deliver output to, a man-machine interface (MMI) 110 functional block, another mobile communications apparatus, computer, or the like. The apparatus 100 is run under supervision of an operating system 102. The apparatus 100 may further comprise an image capturing device 112, which may be embodied as a camera or the like. Alternatively the apparatus 100 may be operatively coupled to an external image capturing device (not shown) via the communications interface functional block 108. As will be disclosed below the apparatus may have access to sets of images from which the images may be selected. Such images may originate from a video sequence, such as a video file, or from a video surveillance camera. The external image capturing device may be coupled to the apparatus through an external network interface which may be wireless, such as a 3G modem, or a WLAN.

The memory functional block 106 may hold a computer program product 114 comprising software instructions that, when downloaded to a computer, such as the apparatus 100, and run on the processor 104 are configured to perform the subject matter disclosed herein. Alternatively, the software instructions may be separately distributable to be distributed in a computer network (not shown).

Figure 1B:
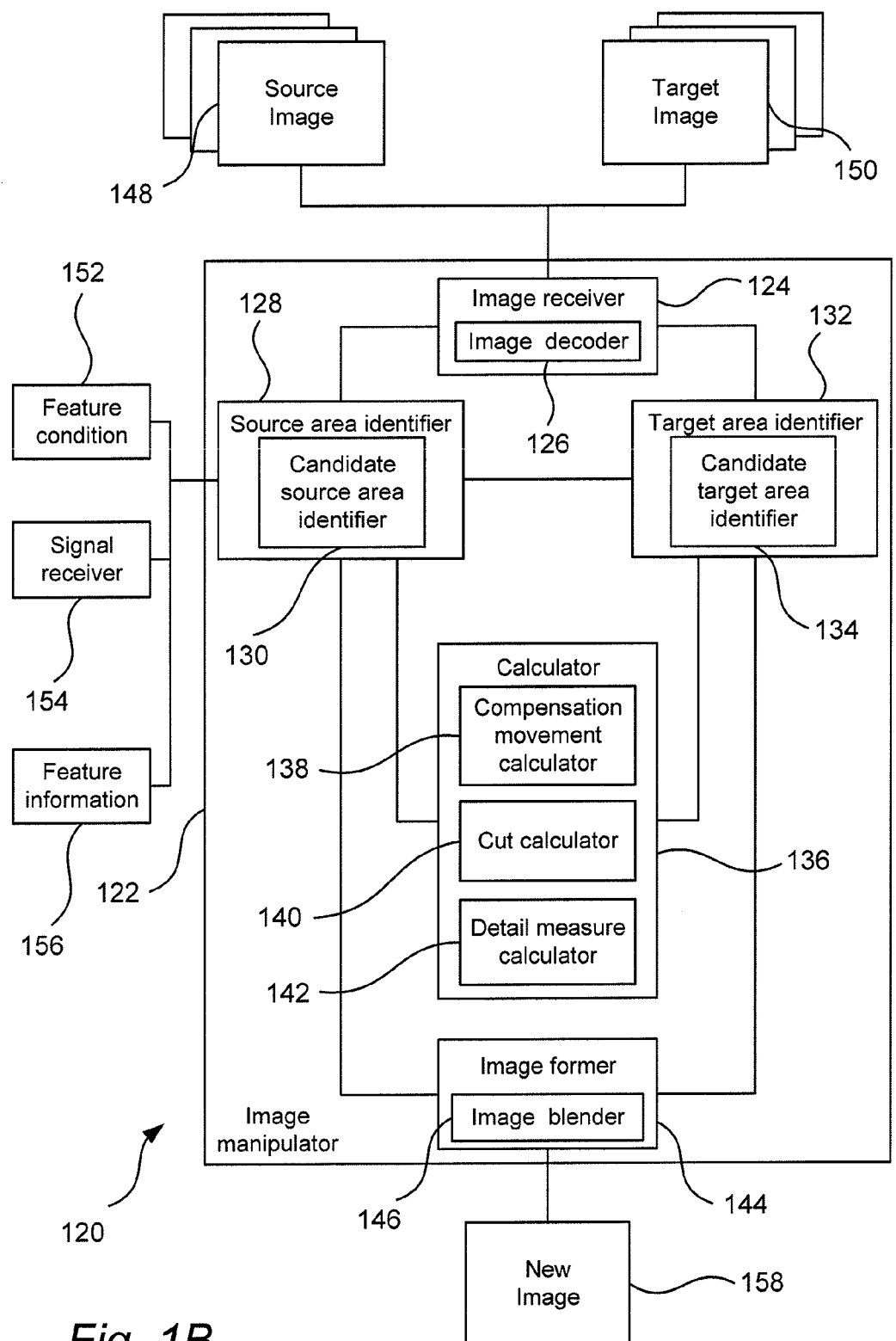

FIG. 1B is a schematic illustration of an image manipulator 120 according to an embodiment. The image manipulator comprises a number of functional blocks which may be implemented in the processor 104 of the apparatus 100 of FIG. 1a. The image manipulator 120 comprises an image receiver 124 arranged to receive source images 148 and target images 150. The image receiver 124 may comprise an image decoder 126 for decoding source and/or target images. The image manipulator 120 further comprises a source area identifier 128 coupled to the image receiver 124 and arranged to in the source image 148 identify an area. The source area identifier 128 may comprise a candidate source area identifier 130 arranged to identify a candidate source area on which the source area may be based. The image manipulator 120 further comprises a target area identifier 132 coupled to the image receiver 124 and the source area identifier 12 and arranged to in the target image 150 identify an area based on the source area. The target area identifier 132 may comprise a candidate target area identifier 134 arranged to identify a candidate target area on which the target area may be based. The image manipulator 120 further comprises a calculator block 136 coupled to the source area identifier 128 and the target area identifier 132 and which may comprise a block 138 arranged to calculate compensation movement between, a block 140 arranged to calculate a cut, and a block 142 arranged to calculate a detail measure. The image manipulator 120 further comprises an image former 144 coupled to the source area identifier 128 and the target area identifier 132 arranged to form a digital image 158. The image former may comprise an image blender 146 arranged to blend the image to be formed. The source area identifier 128 is further coupled to a signal receiver 154 arranged to receive user input, to a feature information block holding information relating to features of the source image 148 and/or target image 150, and to a feature condition block 152 holding conditions relating to the features.

Figure 7:
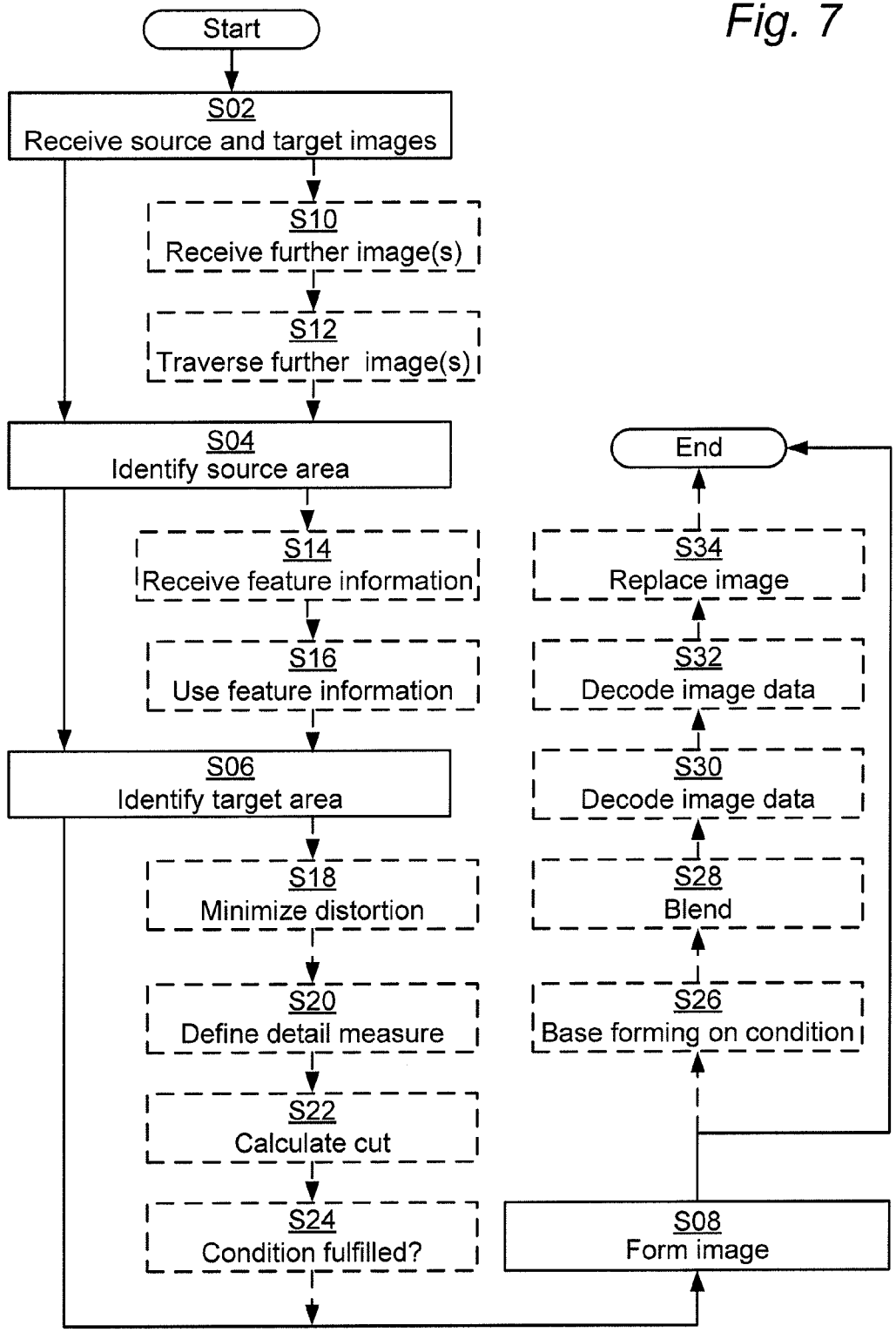
FIG. 7 is a flowchart of methods according to embodiments.

A method for digital image manipulation will now be described with reference to the apparatus 100 of FIG. 1a, to the image manipulator 120 of FIG. 1B and to the flowchart of FIG. 7. In general, the subject matter disclosed herein may enable a preliminary area in a digital image that, for example, is considered as unsatisfactory, unfavorable or undesired, to be specified and replaced with image data considered as satisfactory from another digital image. Correspondingly, the subject matter disclosed herein may enable a preliminary area in a digital image that, for example, is considered as satisfactory, favorable or desired, to be specified and replace image data considered as unsatisfactory, unfavorable or undesired, in another digital image. Digital images as considered herein may have been generated by a digital image capturing device 112, such as a digital still image camera or a digital video camera. Operations and devices used during the process of generating digital images are as such known in the art and will not be further disclosed here.

The method comprises receiving a source image 148 and a target image 150, step S02. The source image and the target image may be received by the image receiver 124 of the image manipulator 120, wherein the image receiver 124 may be the receiver of the communications interface 108 of the apparatus 100. In case the apparatus 100 comprises an image capturing device 112, such as a camera, the source image 148 and/or the target image 150 may be received from the image capturing device 112. Alternatively the source image and/or the target image may be received from the memory functional block 106 of the apparatus 100. The source image and the target image may be captured as individual image frames. Alternatively the source image and the target image may originate from a common video sequence, or from two video sequences from different time points, or other substantially similar video sequences.

Figure 2A:
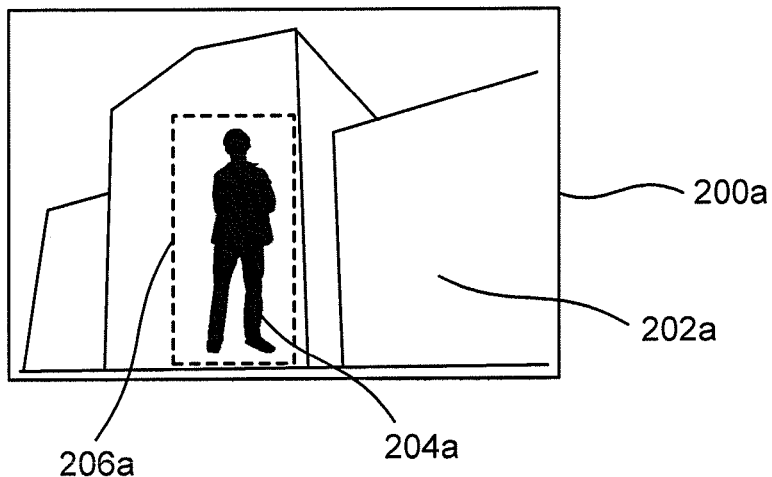
Figure 2B:
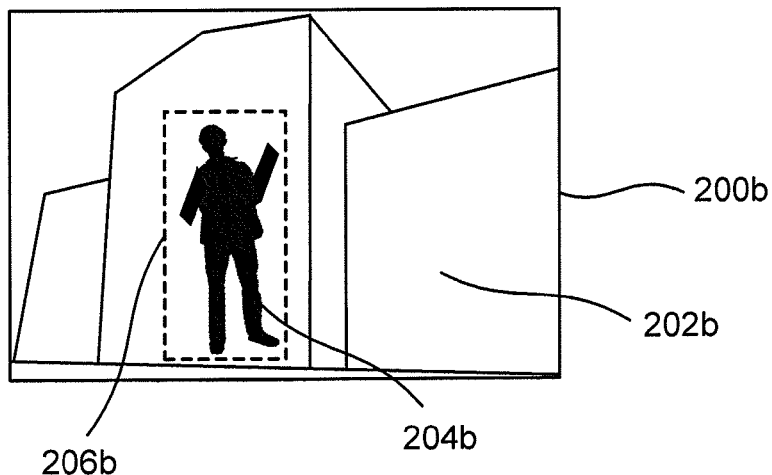

FIG. 2A illustrates an example of a source image 200*a* and FIG. 2*b* illustrates an example of a target image 200*b*. The source image 200*a* comprises a first object 202*a* (in the instant example in the form of a building) and a second object 204*a* (in the instant example in the form of a human being) enclosed in a source area 206*a*. Similarly, the target image 200*a* comprises a first object 202*b* (in the instant example in the form of a building) similar to the first object 202*a* the source image 200*a* and a second object 204*b* (in the instant example in the form of a human being) similar to the second object 204*a* of the target image 200*b* and enclosed in a target area 206*b*. The source object 204 of the source area 206*a* and the target object 204*b* of the target area 206*b* may represent one and the same (real-life) object. In general, the object to be replaced could be determined based on properties of the object. Such properties could be a special unique code, or color that is visible in the image. The color could be similar to the "blue screen" technologies used to "cut" of parts in video production, and the code could be a reflective marker, or a code similar to a 2D bar code.

The source image and the target image may be associated with a different image capturing feature as provided by the feature condition functional block 152. The image capturing feature may relate to exposure. For example, an area of the source image may be associated with a first level of exposure whilst a corresponding area in the target image may be associated with a second level of exposure being higher or lower than the first level of exposure. Thereby an "underexposed" area may be seamlessly replaced with an "correctly exposed" area. Thereby images having high dynamic ranges (HDR) may be efficiently formed. The image capturing feature may relate to resolution. Resolution may be an effect of image zoom. For example, the source image may have a higher resolution than the target image, or vice versa. Thereby areas with low resolution may be seamlessly replaced with areas with high resolution (whilst keeping the aspect ratio of the area). The image capturing feature may relate to focus. For example, an area of the source image may be "in focus" whilst a corresponding area in the target image is "out of focus", or vice versa. Thereby an "out of focus" area may be seamlessly replaced with an "in focus" area. The image capturing feature may relate to blur. For example, the level of blur in an area of the source image may be lower than the level of blur for a corresponding area in the target image, or vice versa. Thereby a blurry area may be seamlessly replaced with a less blurry area. The image capturing feature may relate to flash levels. For example, the source image may have been captured using a flash level being higher than the flash level used when capturing the target image, or vice versa. A high flash level may be desired for some areas in the scene to be captured but may at the same time result in other areas in the images being overexposed. Overexposed areas may thus be seamlessly replaced with corresponding areas from another image captured using a lower flash level. The low flash level may correspond to no flash having been used. The image capturing feature may thus relate to bracketing of at least one of exposure, zoom, focus, blur and flash level. Thereby an image may be formed based on areas from a source image and a target image associated with different exposure, resolution, focus, blur and/or flash level, wherein all areas are associated with desired exposure, zoom, focus, blur and/or flash level. The image capturing feature may relate to a perceived quality of the area, determined by parameters such as amount of smile, or open eyes, see below.

The source image may be selected from a plurality of possible source images. In order to select the source image from the plurality of possible source images each one of the plurality of possible source images may be associated with a distortion measure. The source image may then be selected from the plurality of possible source image as the image having the smallest distortion measure. For example, the image may be selected from the plurality of possible source image as the image having the smallest blur. In general the distortion measure may relate to any one of the above disclosed image capturing feature. The source image may also be selected as the image being closest, in view of a distortion measure, to the target image, see below.

The method further comprises identifying a source area 206a in the source image 200a, the source area 206a having a set of coordinates, step S04. The source area may be identified by the source area identifier 128. The set of coordinates define the location of the source area 206a in the source image 200a. The set of coordinates may further define the area (in spatial terms) of the source area in the source image. For example, the set of coordinates may comprise coordinates defining the location of corners and/or sides of a rectangle in the source image, the set of coordinates may comprise coordinates defining the area and location of a circle in the source image, and the like.

The source area may be based on a received signal identifying the source area, as received by the signal receiver 154. The received signal may be generated from user input received via the MMI 110 of the apparatus 100. Thereby a user may be allowed to manually identify and select an area or an object (see below) in the source image via the MMI 110. Typically the source image is displayed on a display of the MMI 110. In case the MMI 110 comprises a touch sensitive display the user may identify the source area by drawing a line enclosing the source area, or otherwise mark its coordinates. The MMI 110 may also provide a tool facilitating the identification of the source area. The tool may comprise predetermined geometrical objects (such as rectangles, squares, circles, and ellipses) which, via user input, could be used to identify the source area.

As will be further disclosed below the source area may also be identified using feature recognition. The process of feature recognition may use feature information as provided by the feature information functional block 156. The use of such feature recognition may eliminate, or at least reduce, the need to receive user input in order to identify the source area. Hence the method may comprise receiving feature information relating to a feature of at least one of the source image and the target image, step S14. US2009190803A discloses a method and system for detecting and tracking facial expressions in digital images and applications therefore. According to US2009190803A an analysis of a digital image determines whether or not a smile and/or blink is present on a face of a human being. Thus, the feature recognition may relate to recognition of a human person. The feature recognition may relate to recognition of a human face. The feature recognition may relate to recognition of a human mouth. The feature recognition may relate to recognition of a human eye. The feature recognition may relate to recognition of facial expressions of a human being.

Either the source image or the target image, or both the source image and the target image comprises the feature. The source area may then be identified by using the feature, step S16.

The method further comprises using the set of coordinates for the source area 206a (in the source image 200a) to, in response to identifying the source area 206a, identify a target area 206b in the target image 200b, step S06. The target area may be identified by the target area identifier 132. In other words the geometrics of the target area 206b is based on the geometrics of the source area 206a. In particular, the set of coordinates for the source area may be used such that a set of coordinates for the target area in the target image corresponds to the set of coordinates for the source area. The set of coordinates for the target area 206b defines the location of the target area 206b in the target image 200b. The set of coordinates for the target area 206b may further define the area (in spatial terms) of the target area 206b in the target image 200b.

Image data information of the source image and image data information of the target image may represent substantially the same scene. In other words it may be required that a distortion measure between the source image and the target image is below a predetermined threshold value. The distortion measure may relate to the energy between the source image and the target image, see below. The distortion measure may take into account movements, such as translation and/or rotation, the amount of movements being limited by predetermined threshold values. One way to reduce the risk of the distortion measure being higher than the predetermined threshold value is to require that the source image and the target image are received within a predetermined time interval, and/or are within a range for total movement of the scene. It may further be required that the source image and the target image have been captured within a predetermined time interval. In order to determine whether or not the source image and the target image have been captured within a predetermined time interval the apparatus 100 may comprise timing circuitry arranged to measure the time lapsed between receiving the source image and the target image. Alternatively the source image and the target image may be associated with time stamps.

Movement Compensating: When two or more images are captured with an image capturing device, the image capturing device may have moved, in relation to the captured scene, and/or objects in the scene may have moved in relation to each other and/or the image capturing device, in between individual captures. Therefore the source image data to replace the specified target image data (or vice versa) may be translated and/or rotated, by use of the compensation movement calculator 138, to compensate for movements of the image capturing device between the capture of the source image and the target image. This translation may inter alia be accomplished by minimizing an error function considering the pixel wise squared difference between the intensities of the source image and the target image along a preliminary boundary. In general terms the relative movement of the image capturing device may be interpreted as an arbitrary projective transformation. The movement may thus relate to at least one from a translation, rotation, or projection of at least part of the source image in relation to the target image.

When considering images captured within a predetermined time interval, the movement may in many cases be approximated with a simple translation and/or rotation of one image with respect to another. For example, it may be assumed that the movement adds a normal distributed offset to the pixels of the images. A sampling method may be used to reduce the number of evaluations of the error function. The step of identifying the target area may thus further comprise finding a compensation movement between at least a part of the source image and at least a part of the target image. The compensation movement may be selected such that the selected compensation movement minimizes a difference between the source image and the target image, step S18.

Correspondences between pixels in the source image and in the target image may be accomplished by applying inter alia the Harris corner detection process to both images and using a statistical algorithm, such as RANSAC, to find a correspondence map. Alternatively, invariant feature correlations between the source image and the target image may be found. These correspondences may then be used to modify the source image or the target image using inter alia a thin plate spline method (TPS). TPS refers to the physical analogy of fixating points on a surface and letting an imagined thin plate of metal deform in a way that minimizes its internal energy. The displacement of the imagined metal sheet may then be used as a coordinate mapping to warp the source image or target image.

To be able to find a suitable cut (see below) it may beneficial to align the source image and the target image along a preliminary cut boundary. This is may be accomplished by minimizing an error function, for example by minimizing $E(r)=\Sigma_{v\ in\ d\Omega}[I_{si}(v+r)-I_{ti}(v)]^2$ along the preliminary cut $d\Omega$ over a suitably large section S. $I_{si}$ and $I_{ti}$ denote the source image and target image intensities, respectively. For a color image the intensities may be calculated as $I=(R+G+B)/3$, where R, G and B are the red, green and blue color channels respectively, alternatively one may use a luminance channel of a YUV image. The size of the area S may be dependent on the amount of movements between the source image and the target image. It may further be dependent on the time passed between the capturing of the source image and the target image.

There may be different approaches how to minimize the error function, for example by using convolution and fast Fourier transforms. A convolution based method may be fast for calculating the entire error function. It has been discovered that since each term in the sum in the error function is positive it would follow that, while searching for the global minima, a point whose partial sum exceeds that of the current minima could not be a global minima. It would also follow that if the global minima is encountered early, more sums could be ended prematurely, thus saving computations. It could therefore be a beneficial to calculate the error function over a few points in a small area around zero translation and then extend the search area outwards. This may be motivated by the above stated assumption that the translation movement may be considered as normally distributed.

Due to the nature of the translation movement the error function may be assumed to be smooth (and not completely chaotic). The error function may be sampled at intervals which initially are comparatively large. However, if the initial sampling distance d is too large the optimal solution may incorrectly be discarded. The sampling density may then be increased whilst excluding neighboring area of the samples having the relative highest errors are excluded from further calculations. More specifically, the initial sampling distance may be chosen as a power of two and halved at each new iteration. Thus for such a case, at every iteration except the first, one out of four samples is already calculated, in the not already discarded areas. At the end of each iteration the surroundings of the worst three fourths of the samples are discarded.

In a square image where the number of pixels along each side of the images is a power of two, the number of samples calculated is $n/d^2$ $(1+\frac{3}{4} \log_2(d))$. Computational overhead may be added when the best fourth of the samples is to be determined. However, since it comparatively computationally more expensive to evaluate each sample, this overhead may be neglected when considering the total computational effort needed.

Saliency: Saliency may be regarded a measure of conspicuousness of an item or a part of an image in relation to neighboring parts or items in the image. Saliency may thus be regarded as one way of representing details (inter alia corresponding to information content or entropy) in an image. Saliency could be used in the determination of the cut (see below) to direct the cut away from areas in the source image and/or target image that contain such details. Saliency could also be used to measure the amount of conspicuous features introduced due to irregularities in the cut or blending.

To facilitate use of a detail measure, such as saliency, the source area may be associated with a candidate source area (as identified by the candidate source area identifier 130). Likewise the target area may be expanded to a candidate target area as identified by the candidate source area identifier 134). The candidate source area and candidate target area may be defined along the outer border of the source area and target area, respectively, as described further with reference to calculation of boundary and cut.

The method may thus further comprise determining a detail measure between a candidate source area in the source image and a candidate target area in the target image, step S20. The source area and the target area may then be identified based on the determined detail measure as calculated by the detail measure calculator 142.

A method for calculating saliency of an image is described in the paper "A model of saliency-based visual attention for rapid scene analysis" in IEEE Transactions on Pattern Analysis and Machine Intelligence, Vol. 20, No. 11, pp. 1254-1259, November 1998, by Itti et al. In brief the method will transform an RGB-image to maps that are more representative of the way that the human visual system handles image data. It will then perform a series of convolutions on these maps. The result will be normalized using an inhibitory function and then summed up to form a final saliency map. This map may thus provide an indication of the spatial distribution of saliency in the image.

Figure 6A:
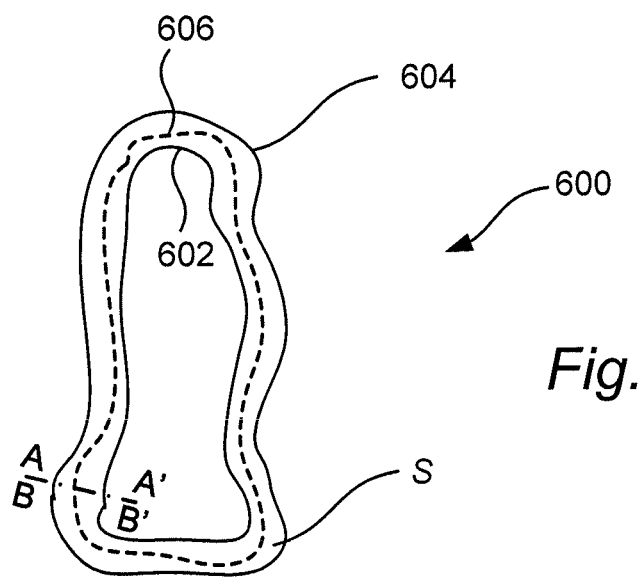
FIGS. 6A and 6B are schematic illustrations of a cut operation according to an example embodiment.
Figure 6B:
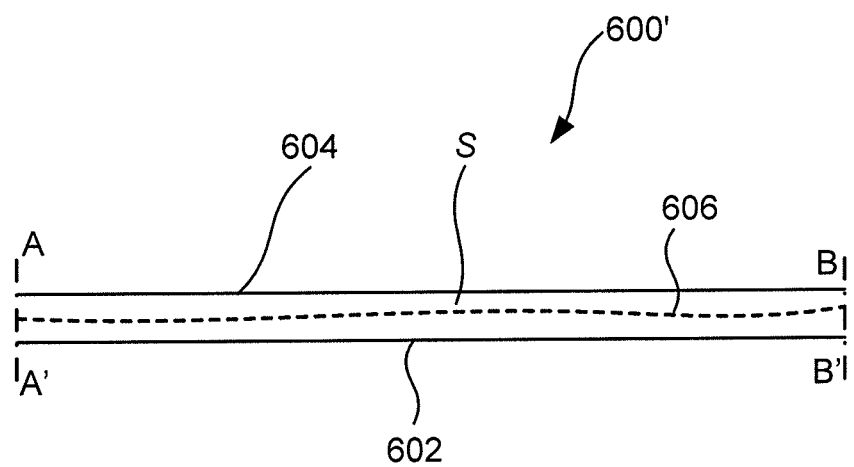

Boundary: A suitable boundary inside which the source image is to be inserted may be determined. The determined boundary represents a cut. The cut may thus define the intersection between the target image and the source image and may be calculated by the cut calculator 140. For illustrative purposes the source image may be regarded as placed on top of the target image wherein the source image (or target image) has been translated as previously described. Inner and outer boundaries defining a section (corresponding to the above disclosed area S) within which the (desired) boundary is constrained may be specified. FIG. 6A illustrates a boundary region 600 having an inner boundary 602 and an outer boundary 604 and a desired boundary 606. An error function, which considers the squared pixel wise difference between the source image and the target image at pixels within the section, is defined. FIG. 6B is a corridor graph representation 600' of the boundary 600 of FIG. 6B, wherein the boundary 600 has been opened along the intersection A-A'-B-B'. The cut may been found by assigning each pixel in the area S with a cost and then finding a closed path in the area S which minimizes the cost. An optimal solution is provided in the paper "Shortest circular paths on planar graphs" in 27th Symposium on Information Theory in the Benelux, vol. p. 117-124, June 2006, Noordwijk, Netherlands by Farin et al. When representing the pixels with a graph, such as the corridor graph 600', the graph has a trellis structure. The graph associated with the area S may thus be represented as a trellis and hence dynamic programming may be used instead of Dijkstra's algorithm. Thus a tail-biting path (i.e. a path in the corridor graph 600' beginning and ending in pixels yielding an enclosed boundary 606 in the corresponding boundary region 600) with a minimum error of all paths or a path with an error below a predetermined threshold may then be found within the section S. The thus found cut defines the cropping of the source image and the target image. An approximate solution, which is much faster and easier to implement, may be found in a single pass of dynamic programming. Each node in the graph knows where the shortest path crossing it originated, and thus a closed path may easily be found when the pass is complete. The method may thus further comprise, in a step S22, identifying the source area and the target area by calculating a cut using the candidate source area and the candidate target area. The cut may define a border enclosing the source area, and the cut may be determined such that the detail measure is minimized.

Figure 2C:
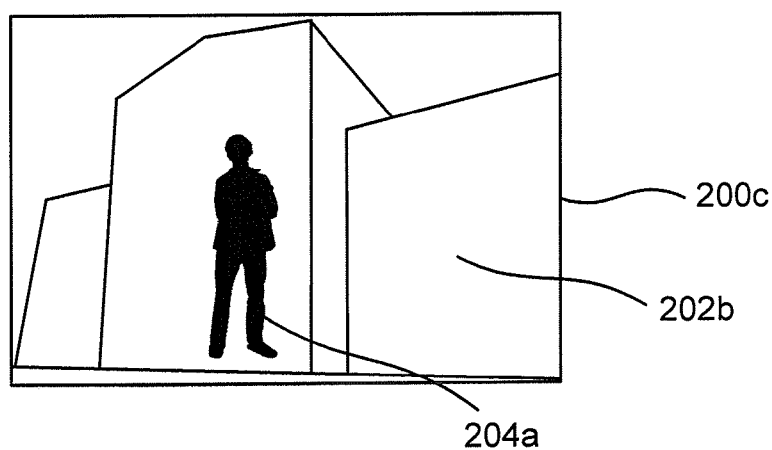
Figure 3A:
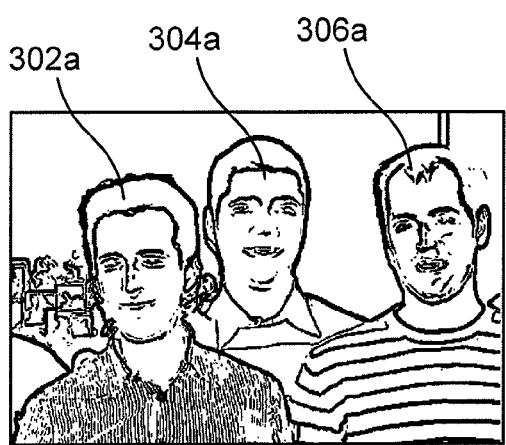
Figure 3B:
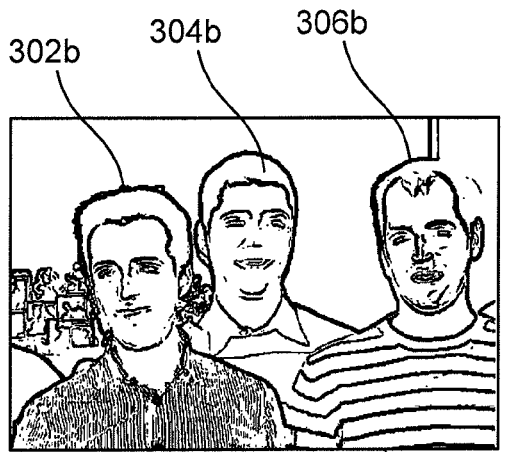
Figure 3C:
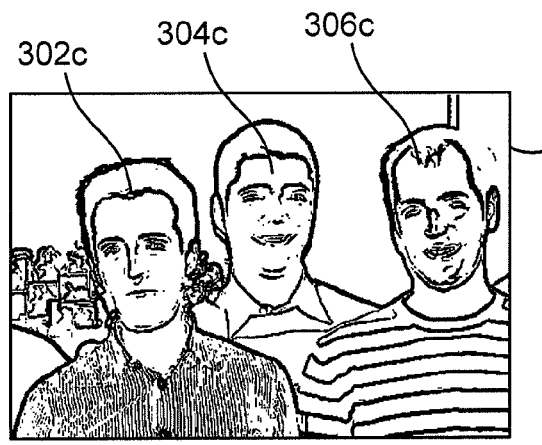
Figure 3D:
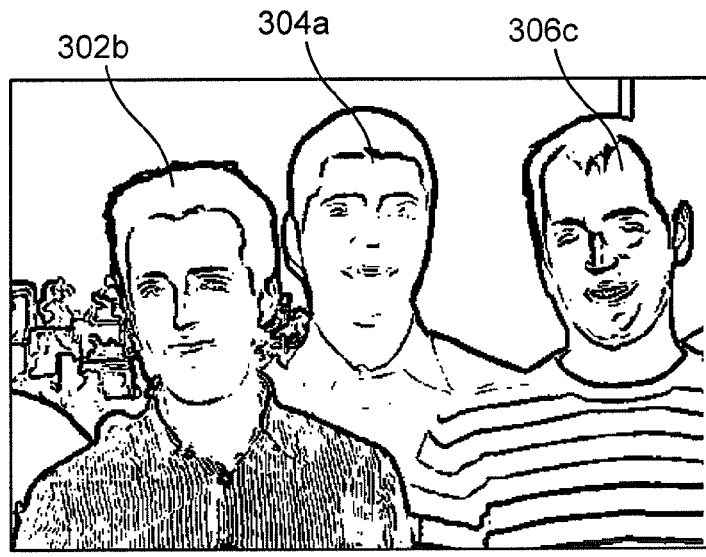

The method further comprises, in a step S08, forming a digital image. The digital image may be based on image data information of the target image wherein image data information of the target area is seamlessly replaced with image data information of the source area. Correspondingly the digital image may be based on the source image wherein image data information of the source area is seamlessly replaced with image data information of the target area. the image may be formed by the image former 144. FIG. 2C illustrates an example of an image 200c based on image data information of the source image 200a and the target image 200b of FIGS. 2A and 2B, respectively. In comparison to the source image 200a and the target image 200b the formed image 200c comprises the first object 202b of the target image 200b and the second object 204a of the source image 200a. Thus, in the formed image 200c a target area corresponding to the second object 204b has in the target image 200b been replaced by a source area corresponding to the second object 204a in the source image 200b.

Feature recognition may be used to determine whether or not one of the source area and the target area fulfills a condition relating to the feature information, step S24. The digital image may then be formed based on this determining, step S26. For example, wherein, in a case the source area fulfills the condition, the image data information of the target area may be seamlessly replaced with the image data information of the source area. For example, wherein, in a case the target area fulfills the condition, the image data information of the source area may be seamlessly replaced with the image data information of the target area.

Particularly, in case feature information relates to a facial expression, and one of the source image and the target is classified as comprising a smiling face the image may be formed to include the smiling face. In order to achieve this facial detection may be used. When a face has been detected smile detection may be used by detecting the lips of the thus recognized face and classifying the detected lips, inter alia depending on their curvature, into at least two categories, such as smiling lips or non-smiling lips. A similar classification may be performed to detect blinking eyes or red eyes (inter alia caused by flash effects during capture of the image comprising the red eyes). The method may thus, further comprising identifying a facial expression to be used when forming the digital image. Thereby "sad" faces may be replaced with "happy" faces, wherein the "sad" faces are associated with non-smiling lips and "happy" faces are associated with smiling lips.

Blending: A gradient-domain-like blending may be applied to ensure that the insertion of the source area into the target image (or vice versa) is seamless. In more detail, when (an area from) a source image is to be blended into a target image (or vice versa), the boundary of the source image should at least approximately equal the boundary of the target image. This may require the source image and/or target image to be manipulated in some way, for example by the image blender 146. Advantageously the manipulation should only impose gradual changes on the interior of the source image in order to be as visually undetectable as possible.

One example which accomplishes the desired effect is Poisson blending. More specifically the gradient field of the source image may be modified in such a way as to find the source image which has a gradient field that is closest (in $L_2$-norm sense) to the target image, subject to some boundary conditions. Therefore Poisson blending is also known as gradient domain blending. The harmonic membrane calculated by the Poisson blending can be approximated using meanvalue blend. The membrane is very smooth away from the boundary of the cloned region. Thus a much sparser calculation density may be applied away from the boundary. Instead linear interpolation for the remaining pixels may be used. As will be described next, one way of accomplishing this is to use a quad-tree structure. Once the structure is created it can be reused for all three color channels. The method may thus further comprise blending the source image and the target image using quad-tree optimization, step S28.

A node in the tree has the shape of a square and is called an s-node when it has the side length $l=2^s$. Each node has 4 children of type (s-1)-nodes, thus forming a quad-tree. The smallest node size is then the 0-node with side length $l=1$. To ensure that the node sizes are not increasing too fast a constraint that no two neighboring nodes must have a size difference $|\Delta s|>1$ may be added. Furthermore, nodes on the boundary are defined to be 0-nodes thus forming the base on which to grow the tree structure.

A memory map may first be initialized by filling it with zeros (representing 0-nodes) inside the area to be blended $\Omega$) and with −1 outside the area. This map is then iterated over with step length $l_n=2^n$ in both height and width where n=1, 2, . . . . For each visited point neighboring points, are compared to the current iteration (n). If all neighboring points are at least (n−1)-nodes and are all inside $\Omega$, the current point is promoted to an n-node. This process may then be repeated for all n.

A decrease in computational requirements may be achieved by sampling the boundary, rather than using all of the boundary pixels. The mean-value weight of each boundary vertex decays quickly with distance. Thus an accurate approximation of the area to be blended may be achieved by sampling the boundary with a density that is inversely proportional to the distance. For example, only a constant number of boundary vertices may be used when computing the coordinates and the area to be blended at each quad node. Such sampling can be based on decoding of the desired region in one or more smaller scales; such decoding can be performed fast and accurately in image formats such as JPEG.

After an optimal cut has been determined local discontinuities can be suppressed (before blending) by using the above disclosed thin plate spline method after finding correspondences between the source image and the target image along the cut. For each point on the source boundary a point on the target boundary may be found that minimizes the squared pixel difference along a line segment surrounding the points. This may be regarded as a form of one-dimensional feature matching.

In order to overcome problem of delays, i.e. that compressed full size images being time consuming to process, and storage capacity, i.e. uncompressed images occupying a large image area, the source and/or target image(s) may be analyzed and features facilitating fast manipulation of an image is stored in the (respective) image file(s), temporarily stored in the memory for the present manipulation, or stored as an entry in a database, the entry in a database may refer to the image file. A series of methods for analyzing, extracting and storing such features relating to an image is described in the patent application WO 2005/050567 by Scalado A B.

In order to extract the features facilitating fast manipulation of an image, the features may either be extracted during compression of the source and/or target image(s) or the features may be extracted during a post compression analysis of a compressed image, such as by the image decoder 126. In case of the source and/or target image(s) image being compressed using JPEG compression, or a similar compression method, the features facilitating fast manipulation of an image retrieved and stored may be any single one of or any combination of indicators to minimum coded units (MCUs), a MCU being a small image blocks of the image, indicators to one or a plurality of data units (DUs), a data unit being a data block representing one channel or color component of the MCU, one or a plurality absolute or relative DC-coefficients of one or a plurality of the color components of the retrieved MCUs and/or of the retrieved data units, or number of bits between data units, or between specific coefficients of the data units. As features need to be extracted and/or analyzed in various scales, such techniques can be used to perform such extraction of data efficiently. How to utilize such features to achieve fast manipulation of an image is described in the above mentioned application, i.e. WO 2005/050567 by Scalado A B.

Thus, in case the source image has been encoded, the method may further comprising in the source image decoding only image data information representing the source area, and/or decoding such area in the required scale, step S30, by using the above features facilitating fast manipulation of an image. Similarly, in case the target image has been encoded, the method may further comprising in the target image decoding only image data information representing the target area, step S32, by using the above features facilitating fast manipulation of an image. The final encoded new image can also be built upon source/target images with parts replaced by new image data, thus facilitating reuse of at least parts of the source/target compressed images.

The length of a data unit may be defined as the number of bits needed to represent the data unit. In compression of MCUs and DUs it is common to apply variable-length encoding, such as Huffman encoding resulting in the data units having different DU lengths depending on the degree of information represented thereby. Thus, a data unit representing a high level of information (corresponding to a high level of information content in the corresponding image block) may have a longer DU length than a data unit representing a level of information being lower than said high level of information (corresponding to a level of information content in the corresponding image block being lower than said high level of information content). Hence, the above disclosed detail measure may be based on DU lengths of data units in the candidate source area and the candidate target area. As MCU consist of one or more DU, the measure can also be based on an MCU, or any plurality of DU or MCU.

The method may further comprise, in a step S34, replacing one of the target image and the source image with the formed digital image, thereby reducing memory requirements for storing images.

Next, typical scenarios wherein the disclosed subject-matter may apply will be disclosed.

EXAMPLE 1

A first example, as illustrated in FIGS. 3A, 3B, 3C, and 3D, considers a case in which it may be desirable to replace non-stationary objects in an image. When capturing an image comprising one or more non-stationary objects, such as human beings, it is not uncommon for (parts of) the non-stationary objects to move during the image capture. This may result in images wherein the capture of the non-stationary object is considered as unsatisfactory, unfavorable or undesired, such as an image wherein a human is blinking with an eye, or the like. In this case one option could be to capture another image of the same scene and hope that the result will be more satisfactory, favorable or desired. However when capturing a second image other objects in the image may be considered as unsatisfactory, unfavorable or undesired. Thus, none of the captured images may, when considered individually, be regarded as satisfactory, favorable or desired. In this case it would be desirable to replace only certain areas of the first image with more satisfactory, favorable or desired image captures of the same scene. For example, in a first capture 300a of a group photo the appearance of a first person 302a may be considered as unsatisfactory (inter alia due to a blinking of an eye) whilst the appearance of a second person 304a may be considered as satisfactory and the appearance of a third person 306a may be considered as unsatisfactory (inter alia due to a blinking of an eye). In a second capture 300b of the same group photo the appearance of the first person 302b may be considered as satisfactory whilst the appearance of the second person 304b may be considered as unsatisfactory and the appearance of the third person 306b may be considered as unsatisfactory. In a third capture 300c of the same group photo the appearance of the first person 302c and the second person 304c may be considered as unsatisfactory whilst the appearance of the third person 306c may be considered as satisfactory. By using methods disclosed herein it is possible to in the first image 300a replace the image data information representing the first person 302a with image data representing the first person 302b from the second image 300b, and to replace the image data information representing the third person 306a with image data representing the third person 306c from the third image 300c, thus resulting in a satisfactory image 300d. Similarly, the image 300d may be based on either image 300b or image 300c. Thus, in general the method may further comprise receiving at least one further source and/or target image, in a step S10, and traversing the target image, the source image and the at least one further source and/or target image, step S12, and forming an image based on the source image, the target image and the at least one further source and/or target image.

EXAMPLE 2

A second example, as illustrated in FIGS. 4A, 4B, and 4C, considers a case in which it may be desirable to remove non-stationary objects from an image. For example, in a first image 400a a non-stationary object 404a may in a first area 406a obstruct the view of a desired object 402 to be captured, whilst in a second image 400b a non-stationary object 404b may in a second area 406b obstruct the view of a desired object 402 to be captured. By using methods disclosed herein it is possible to in the first image 400a replace the image data information representing the non-stationary object 404a in the first area 406a with image data representing the first area 406a from the second image 400b, thus resulting in a satisfactory image 400c. Similarly, by using methods disclosed herein it is possible to in the second image 400b replace the image data information representing the non-stationary object 404b in the second area 406b with image data representing the second area 406b from the first image 400a, thus resulting in a satisfactory image 400c.

EXAMPLE 3

Figure 5A:
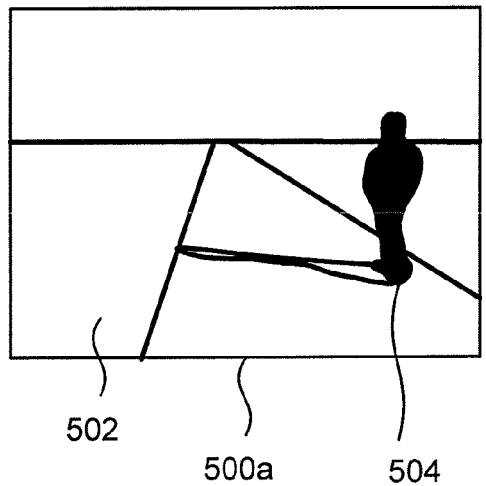
Figure 5B:
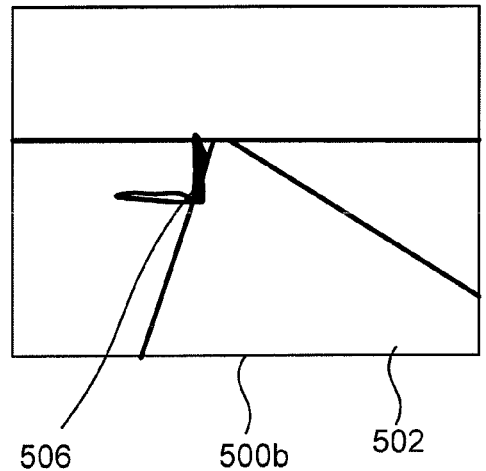
Figure 5C:
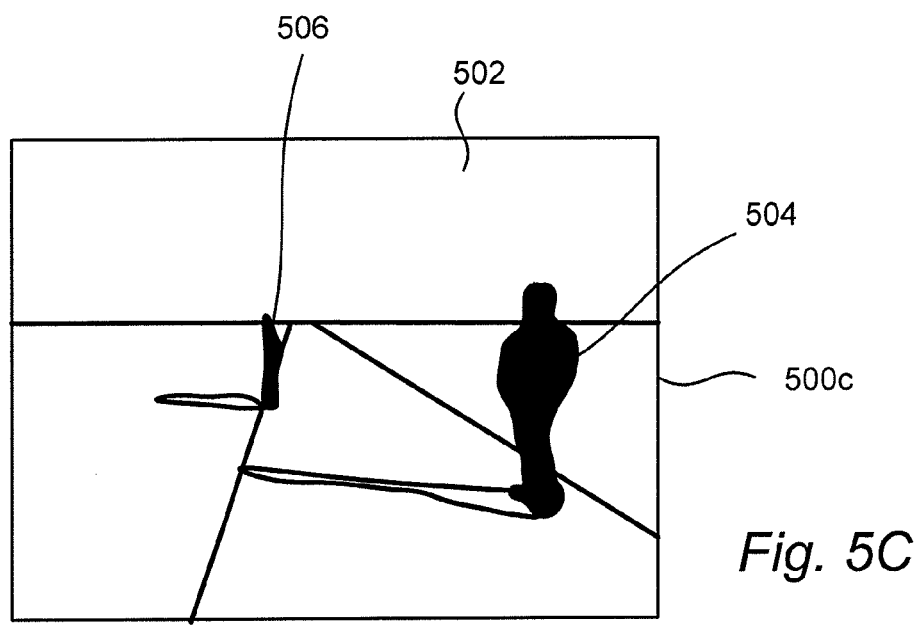

A third example, as illustrated in FIGS. 5A, 5B, and 5C, considers a case in which it may be desirable to add non-stationary objects to an image. For example, in a first image 500a a non-stationary object 504 may be located at a first set of coordinates, whilst in a second image 500b the same non-stationary object 506 may be located at a second set of coordinates different from the first set of coordinates. By using methods disclosed herein it is possible to seamlessly insert a copy of the non-stationary object 504 located at the first set of coordinates in the second image 500a and/or to seamlessly insert a copy of the non-stationary object 506 located at the second set of coordinates in the first image 500b, thus resulting in a composite image 500c.

The invention has mainly been described above with reference to a certain examples. However, as is readily appreciated by a person skilled in the art, other examples than the ones disclosed above are equally possible within the scope of the invention, as defined by the appended patent claims.

We claim:

1. A method comprising:
   receiving a first image comprising a first non-stationary object in a first area obstructing a desired first view;
   receiving a second image comprising a second non-stationary object in a second area obstructing a desired second view, wherein the first and second areas are different;
   displaying the first image; and
   with a processor, removing the first non-stationary object from the displayed first image by replacing, in the displayed first image, displayed image data information representing the first non-stationary object in the first area of the displayed first image with replacement image data representing the first area in the second image.

2. The method according to claim 1, further comprising: processing the first image and the second image to determine the first image area and the second image area.

3. The method according to claim 1, further comprising: enabling a user to control replacement of the first area.

4. The method according to claim 3, wherein the user control is via a touch-sensitive display.

5. The method according to claim 1, wherein the first area is identified to a user.

6. The method according to claim 1, wherein the first image and the second image have been captured in succession within a time interval with a small temporal difference between captures.

7. The method according to claim 1, wherein the first image is selected from a plurality of possible first images.

8. The method according to claim 7, wherein each one of said plurality of possible first images is associated with a quality measure, and wherein the source image is selected from the plurality of possible source image as the image having smallest quality measure.

9. The method according to claim 1, wherein the first image and the second image are captured in any order.

10. The method according to claim 1, wherein first image and the second image represent substantially the same scene.

11. The method according to claim 1, wherein areas of digital images are replaced seamlessly.

12. The method according to claim 1, further comprising:
   identifying the first area in the first image, the identified area having a set of coordinates; and
   using the set of coordinates for the identified area to, in response to said identification, identify the first area in the second image.

13. The method according to claim 12, wherein identifying said first area in the second image further comprises finding a compensation movement between at least a part of the first image and at least a part of the second, such that said compensation movement minimizes a difference between the source image and the target image.

14. The method according to claim 1, wherein the first image, the second image and the third image originate from a video sequence.

15. A non-transitory computer-readable storage medium encoded with instructions that, when performed by a processor, cause performance of the method of claim 1.

16. An apparatus comprising at least one processor and at least one memory including computer program code, the at least one memory and the computer program code configured to, with the processor, cause the apparatus to at least perform:
   receiving a first image comprising a first non-stationary object in a first area obstructing a desired first view;
   receiving a second image comprising a second non-stationary object in a second area obstructing a desired second view, wherein the first and second areas are different;
   displaying the first image; and
   removing the first non-stationary object from the displayed first image by replacing, in the displayed first image, displayed image data information representing the first non-stationary object in the first area of the displayed first image with replacement image data representing the first area in the second image.

17. The apparatus according to claim 16, wherein the at least one memory and the computer program code are further configured to, with the at least one processor, cause the apparatus at least to perform:
   processing the first image and the second image to determine the first image area and the second image area.

18. The apparatus according to claim 16, wherein the at least one memory and the computer program code are further configured to, with the at least one processor, cause the apparatus at least to perform:
   enabling a user to control replacement of the first area.

19. The apparatus according to claim 18, wherein the apparatus further comprises a touch-sensitive display.

20. An apparatus according to claim 19 wherein the at least one memory and the computer program code are further configured to, with the at least one processor, cause the apparatus at least to perform identifying the first area to a user.

21. The apparatus according to claim 16, wherein the apparatus is configured as a mobile communications apparatus comprising a man-machine interface and a transceiver.

* * * * *